United States Patent [19]
Kurichh

[11] 3,857,614
[45] Dec. 31, 1974

[54] AIR BRAKE ANTISKID CONTROL

[75] Inventor: Sham L. Kurichh, Owosso, Mich.

[73] Assignee: Midland-Ross Corporation, Cleveland, Ohio

[22] Filed: Oct. 12, 1973

[21] Appl. No.: 405,835

[52] U.S. Cl. ............... 303/21 F, 188/181 A, 303/40
[51] Int. Cl. .............................................. B60t 8/06
[58] Field of Search ................. 303/21 F, 61–63, 303/68–69, 40; 188/181 A; 137/613

[56] References Cited
UNITED STATES PATENTS

| | | | |
|---|---|---|---|
| 3,743,362 | 7/1973 | Neisch | 303/21 F |
| 3,758,167 | 9/1973 | Machek | 303/21 F |
| 3,768,519 | 10/1973 | Morse | 303/21 F |

Primary Examiner—Trygve M. Blix
Assistant Examiner—D. C. Butler
Attorney, Agent, or Firm—Irvin L. Groh

[57] ABSTRACT

An antiskid control valve for use with an air brake system on a vehicle which also includes an antiskid control system capable of detecting actual or potential locking of the braked wheels and providing a signal to actuate the antiskid valve. The antiskid valve provides for unrestricted operation of the brakes by delivery of air from a reservoir to brake actuating chambers until a signal is received of a potential wheel lock at which time the brakes are automatically released and further delivery of air from the reservoir to the brake chambers is prevented until the braked wheels resume rotational speed. After the wheel lock condition is avoided, the brakes are reapplied at a controlled rate due to a restriction in the line delivering air from the reservoir to the chambers for operation of the brakes.

14 Claims, 4 Drawing Figures

AIR BRAKE ANTISKID CONTROL

SUMMARY OF THE INVENTION

This invention relates to air brake systems for vehicles and more particularly to systems employing antiskid features.

The supply of compressed air on a vehicle equipped with air brakes is constantly being depleted during braking operation since the release of the brakes requires exhausting air from the brake applying actuators. Antiskid or antilock devices which automatically exhaust air to release the brakes and supply air to apply the brakes often respond slowly and as a consequence, use large quantities of air which results in over-release and over-application of the brkes. Devices attempting to avoid this problem become complex and although air may be used more efficiently in the antiskid phase of braking operation, the various components restrict the flow of air during normal braking. This type of operation makes some devices completely unacceptable particularly in view of safety standards which regulate not only stopping distances but also the speed at which air must be admitted and exhausted to both apply and to release the brakes.

It is an object of the invention to provide an antiskid device for an air brake system in which the rate of brake reapplication after the brakes have been automatically released in the antiskid cycle of operation is controlled at a rate utilizing a restricted or metered quantity of air more efficiently.

Another object of the invention in to provide an air brake antiskid control system in which the rate at which air is delivered from an air reservoir to brake applying means is restricted only during the antilock cycle and at all other times is delivered without restriction.

An air brake antilock control is provided in which the rate at which the brakes are reapplied after they have been released in an antiskid cycle of operation is regulated by a restrictor means which limits the rate at which air can be supplied to apply the brakes. This prevents application of the brakes beyond the point at which the wheels lock so that air is conserved. The restrictor element responds to the initiation of the antiskid cycle and maintains a constant metering of the air from the supply reservoir to the brake applying air chamber until the entire antiskid cycle is completed. After the antiskid cycle of operation, the restrictor returns to its inoperative position in which it offers no resistance to the flow of air during subsequent normal braking which do not require skid control.

DETAILED DESCRIPTION

Figure 1:
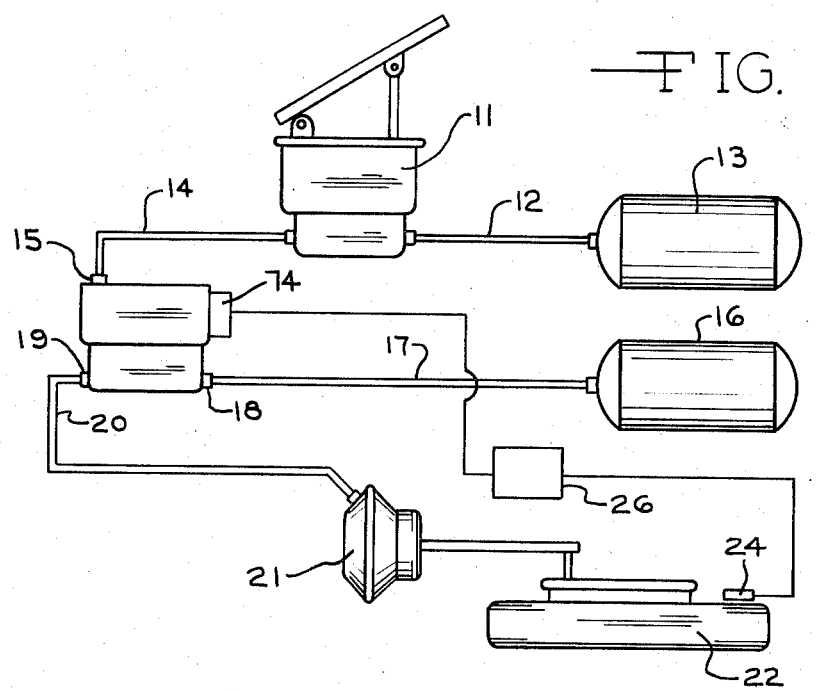
FIG. 1 is a schematic diagram of a vehicle air brake system incorporating the antiskid control mechanism embodying the present invention.

Referring to the drawings and particularly to FIG. 1, an antiskid control valve 10 embodying the invention is adapted for use in an air brake system incorporating a conventional foot operated treadle valve 11 connected by an air line 12 to receive air from a reservoir 13 and deliver air through a line 14 to a control port 15 of the antiskid valve assembly 10. Also connected to the antiskid valve assembly 10 is a service reservoir 16 which delivers air through a line 17 to a supply port 18 of the antiskid control valve 10. The antiskid valve 10 is also connected through a delivery port 19 to an air line 20 which is connected to one or more brake actuators or chambers one of which is indicated at 21. Depressing the foot valve 11 delivers air at a regulated pressure from the reservoir 13 through the lines 12 and 14 to the control port 15 of the antiskid valve assembly 10 which in turn controls the delivery of air from the service reservoir 16 through the line 17 to the antiskid valve assembly 10 and through the line 20 to the brake actuator 21. Delivery of air pressure to the brake actuator 21 causes the brakes associated with a wheel 22 to be actuated and the exhaust of air causes the brakes to be released.

Associated with the wheel 22 is a sensor 24 of any known type which is effective to measure the speed of the wheel and to deliver the speed information electrically to a computer 26 which computes the acceleration or deceleration rates of the wheel 17 and transmits the resultant signal to energize or de-energize a solenoid 74 forming a part of the antiskid valve assembly 10 to automatically control the braking as will be more fully described hereafter.

Figure 3:
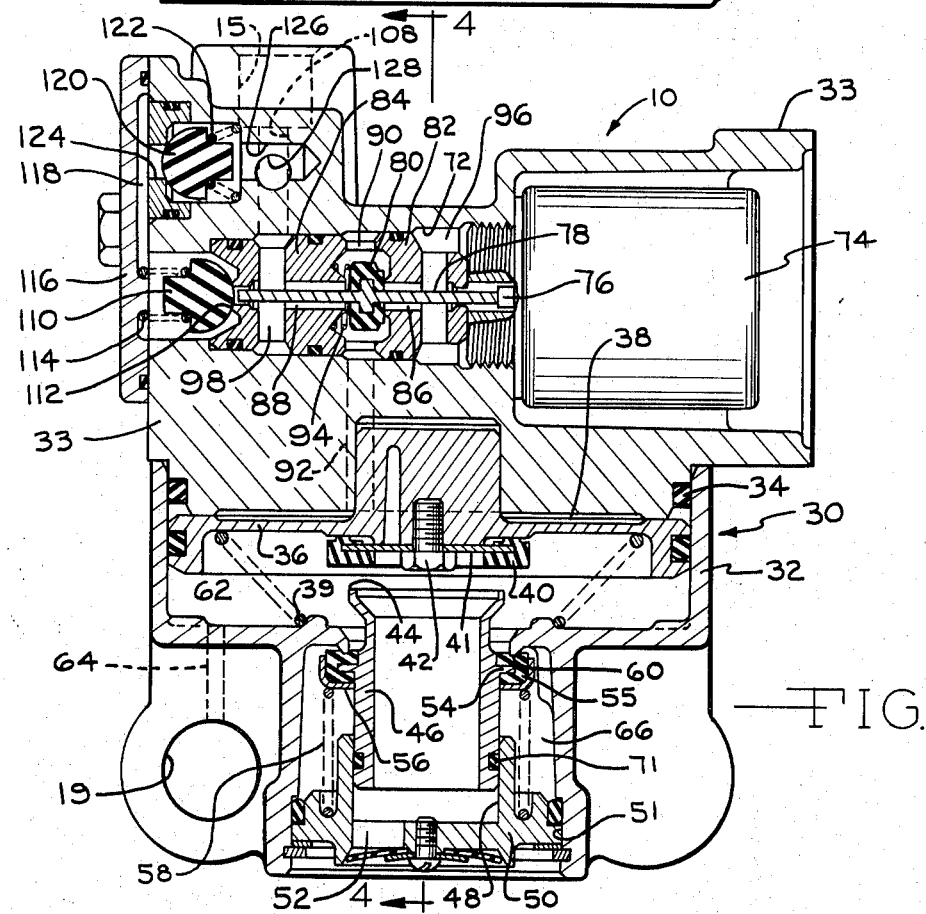
FIG. 3 is a sectional view taken on line 3—3 in FIG. 2.

Referring now to FIG. 3, the antiskid valve assembly 10 includes a relay valve section 30 at the bottom portion of the antiskid valve assembly 10. The relay valve section 30 includes a generally hollow housing 32 which is sealed relative to an upper housing structure 33 by means of seal 34 and is fastened thereto any conventional manner as by bolts (not shown).

A piston 36 is slideable disposed within hollow housing 32 and forms a control chamber 38 at its upper side. The delivery of air pressure to the control chamber 38 causes the piston 36 to move downwardly against the biasing action of a spring 39. The central portion of the piston 36 has a rubber-like valve element 40 which has a reinforcing plate 41 held at the axis of the piston by means of a screw fastener 42. The valve element 40 is adapted to engage an annular lip 44 formed by the open, upper end of tubular member 46. The tubular member 46 is disposed to slide in a bore 48 formed in an end cap 50 which is sealed in an opening 51 in the lower end of housing 32. An exhaust opening 52 formed in the end cap 50 communicates the interior of the tube 46 with the atmosphere. An intermediate exterior portion of the tubular member 46 is formed with flange 54 which receives an annular rubber element 55 having a U-shaped cross-section. The element 55 is held on the flange 54 by a retaining ring 56 which forms a seat for one end of a spring 58 having its other end acting on the end cap 50 to urge the valve element 55 into engagement with the annular lip 60 formed internally of the housing 32.

Figure 4:
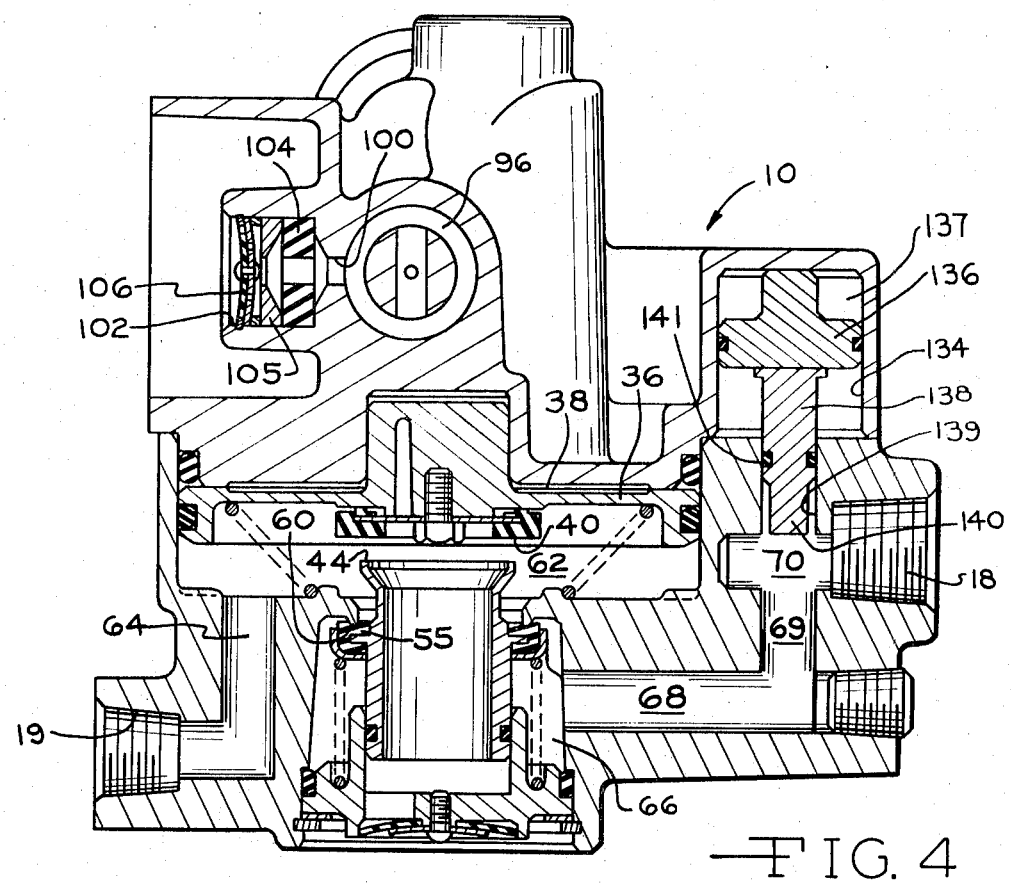
FIG. 4 is a sectional view taken on line 4—4 in FIG. 3.

In the position shown, the interior of the tubular member 46 communicates by way of the exhaust opening 52 with the atmosphere and by way of the open upper end of the tube, with a large cavity 62 formed in the housing 32 below the piston member 36. The cavity 62 is also in communication by way of an axially offset passage 64 with the delivery port 19 which is adapted for connection with the line 20 to the brake actuator 21. In this position, with the valve element 55 seated on the annular lip 60, an annular chamber 66 is formed around the exterior of the tubular member 46 which, as best seen in FIG. 4 is in communication with passages 68 and 69 to a cavity 70. The cavity 70 is open to the inlet port 18 connected by the line 17 to the service reservoir 16. A seal 71 on the exterior of the tubular member 46 prevents fluid communication between chamber 66 and the atmosphere.

Upon delivery of air pressure to the control chamber 38 above the control piston 36, the valve element 40 moves downwardly to engage the annular lip 44 to close the open upper end of the tube 46 and moves the latter downwardly to move the valve element 55 out of engagement with the annular lip 60 forming a valve seat. This places the large cavity 62 below the control piston 36 in communication with the supply port 18 from the service reservoir 16 while maintaining the large cavity 62 as well as the delivery port 19 isolated from the exhaust port 52 by way of the valve element 40 closed on the annular lip 38.

In the position shown in FIGS. 3 and 4, the relay valve section 30 serves to communicate the delivery port 19 with the exhaust port 52, in which case the air in the brake chamber 21 is exhausted and the brakes at the wheel 22 of the vehicle are released. Upon downward movement of the control piston 36 in response to air pressure in the control chamber 38 above the piston, the brake chamber 21 and the delivery port 19 is isolated from the exhaust port 52 by the valve 40 closing on the end of the tubular member 46, and subsequently the air pressure existing in the service reservoir 16 is made available through the supply port 18 and through the open valve 55, 60 to the large cavity 62 and from there to the axially offset passage 64, to the delivery port 19 and to the brake actuator 21. In this manner air is delivered from the service reservoir 16 to the brake actuators 21 to actuate the brakes at the wheel 22.

The delivery of air to the control chamber 38 is under the control of the mechanism within the upper housing structure 33 of the antilock valve assembly 10. The upper housing structure 33 includes a transverse, stepped bore 72 one end of which receives a solenoid 74 having a plunger 76 which upon energization of the solenoid 74 moves to the left as viewed in FIG. 3.

A stem 78 extends axially to the left of the solenoid plunger 76 and has an intermediate portion formed with a flange 79. A valve 80 having a U-shaped cross-section is fitted securely on the flange 79. The flange 79 and the valve element 80 is encapsulated in a valve cage formed by a pair of annular plug elements 82 and 84 each having enlarged openings 86 and 88, respectively, offering air passage around the stem 78. The plug elements 82 and 84 form a chamber 90 which communicates by way of a passage 92 with the control chamber 38 at the upper side of the control piston 36.

The opening 86 in the annular element 82 is closed by the valve element 80 which is urged to the position shown by a spring 94 acting between the valve element 80 and the annular plug element 84. Upon movement of the solenoid plunger 76, the valve element 80 moves out of engagement with opening 86 in the annular plug 82 to open communication between the chamber 90 and a cavity 96 to the right of the opening 86. At the same time valve element 80 closes the opening 88 in annular plug element 84 to prevent communication between the chamber 90 and a cavity 98 formed in the bore 72 to the left of the plug element 84. When the solenoid 74 is de-energized, the stem 78 returns under the urging of the spring 94 and air pressure in the opening 88 to the position shown in FIG. 3.

As best seen in FIG. 4, the chamber 96 communicates with the radially extending passage 100 which is open to an exhaust port 102. Disposed within the exhaust port 102 is a rubber-like annular element 104 which is held in position by an annular metal retainer 105. The end of the exhaust port 102 is closed to the entry of dirt and moisture by a flexible valve element 106 which permits easy flow of air to the atmosphere. The cavity 98 (FIG. 3) to the left of the plug element 84 communicates by way of a passage 108 with the control port 15 which is connected to the line 14 and to the treadle valve 11.

Referring to FIG. 3, the left end of the solenoid valve stem 78 engages a check valve element 110 having a generally semi-spherical face which in the position shown is sealed against an annular valve lip 112 which loosely surrounds the valve stem 78 to permit air passage when valve element 110 is unseated. The valve element 110 is urged to closed position by a spring 114 which acts between the valve element 110 and a cover plate 116 bolted in fluid tight relationship to the side of the housing 33.

The cover plate 116 and the housing section 33 form a logic chamber or control cavity 118 which communicates with the cavity 98 when the check valve 110 is open. A second check valve 120 is biased by a spring 122 to seat and close an opening 124 communicating with the logic cavity 118. In the position shown, the valve 120 serves to isolate a chamber 126 from the logic cavity 118. The chamber 126 communicates by means of a cross bore 128 with the control port 15.

Figure 2:
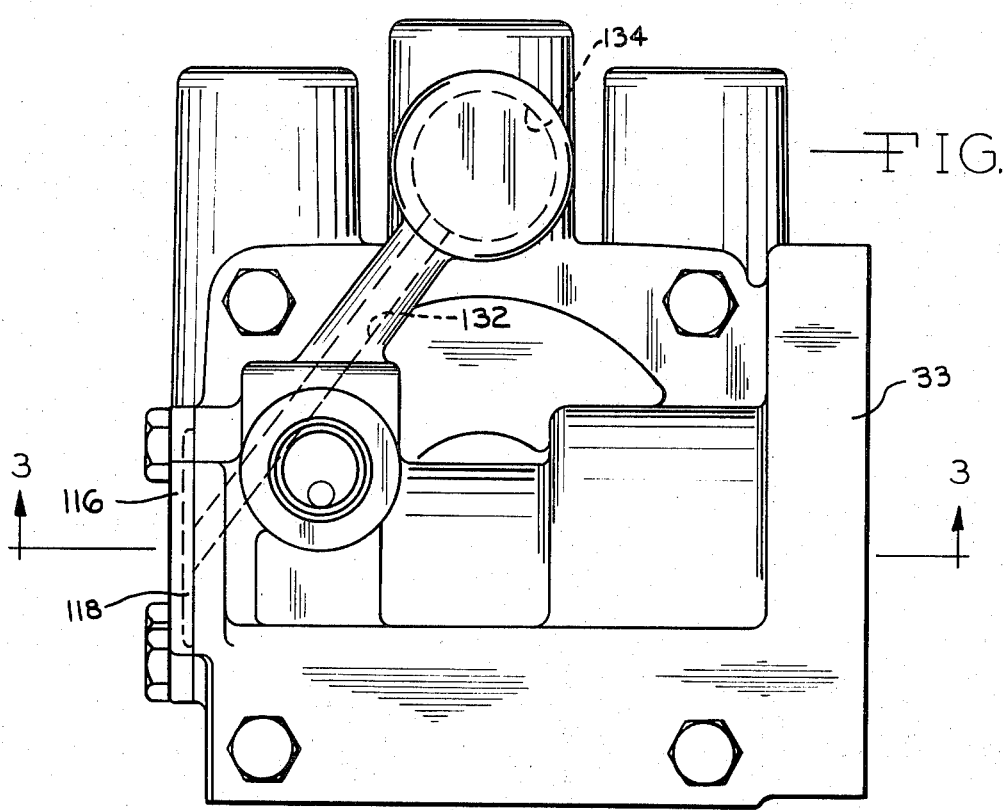
FIG. 2 is a top elevation showing the antiskid control mechanism.

The logic cavity or chamber 118 communicates by way of an elongated passage 132, which can be seen in FIG. 2, with a bore 134 formed in the upper housing section 33. Referring now to FIG. 4, the bore 134 houses a piston 136 which is slideable and sealed relative to the bore and forms a pressure chamber 137 at one side which is at all times at the same pressure as the logic cavity 118. The piston 136 is engageable with a flow restricting plunger 138 slideably mounted in a bore 139 formed in the lower housing section 32 which intersects and communicated with the cavity 70. Pressurization of the chamber 137 moves the piston 136 and plunger downwardly so that the latter protrudes into the cavity 70. In this position, the plunger 138 has a reduced portion 140 which forms an annular opening with the walls of the passage 69 which permits passage of air from the supply port 18 to the passage 68 but at a restricted or metered rate. The plunger 138 is provided with a seal 141 which permits easy sliding movement of the plunger 138 in the bore 139 but prevents fluid passage. The seal 141 insures that in the absence of air pressure in the chamber 137, the pressure in the supply port 18 acting on the plunger 138 will move it and the piston 136 upwardly to the position shown in FIG. 4 so that air flow to the passage 69 is not restricted.

The various components are disposed in the position shown in FIGS. 3 and 4 during usual braking operations. Under such conditions, actuations of the treadle valve 11 causes air under pressure to enter the control port 15 through the passage 108 into the cavity 98 and through the opening 88 in the annular member 84 to the chamber 90 from which it passes by way of the passage 92 to the control chamber 38 above the control piston 36 causing it to be moved downwardly. The control piston 36 first closes the valve element 40 on the annular lip 44 to isolate the brake chamber or actuator 21 from the exhaust port 52. Thereafter, additional downward movement of the piston 36 causes the valve element 55 to separate from the annular lip 60 so that air can be delivered from the service reservoir 16 to the delivery port 18 and through the open valve 55, 60 to the enlarged cavity 62 below the control piston 36 and through the offset passage 64 and the delivery port 19 to the brake actuator 21.

The brakes are released when the operator removes his foot from the treadle valve 11 which decreases the air pressure at the control port 15 and therefore in the chamber 38 above the control piston 36 so that the piston moves upwardly under the urging of spring 39 and air pressure in the chamber 62 to first close the valve 55,60 and subsequently to separate the valve element 40 from the lip 44 at the upper end of the valve tube 46 so that the delivery port 19 is in communication with the exhaust port 52 and as a consequence air from the brake actuator 21 can be exhausted to the atmosphere to release the brake at the wheel 22.

If the brakes are applied with excessive force the wheels decelerate and rapidly approach a locked condition. This causes the electronic computer 26 to send a signal to energize the solenoid 74. As viewed in FIG. 3, this causes the solenoid plunger 76 to move to the left so that the valve element 80 closes the opening 88 and opens the central passage 86 in the plug element 82. As a result, the control chamber 90 is isolated from the control port 15 and is open to the atmosphere by way of the exhaust cavity 96 and passage 100 (FIG. 4) with the exhaust port 102. Since the chamber 90 is in constant communication with the control cavity 38 above the piston 36 in the relay valve section, the control cavity 39 also is in communication with the exhaust port 102 seen in FIG. 4 and the atmosphere. This releases the brakes in the same manner as under normal braking conditions but the passage 88 which is closed by the valve element 80 precludes the further introduction of control air from port 15 and the brakes will be automatically released even though the brake pedal at the treadle valve 11 continues to be depressed.

The brakes are released to a point at which the wheel 22 starts accelerating toward the synchronized speed of the vehicle at which point the computer 26 de-energizes the solenoid 74. This causes the spring 94 acting against the valve 80 to urge the latter to the right to close valve opening 86 and expose opening 88. As a result, communication of the chamber 90 with the atmosphere through exhaust port 102 is interrupted. At the same time, chamber 90 as well as the control cavity 38 of the relay valve are placed in communication with the control air from the control port 15.

When the solenoid 74 is energized for the first time in the antiskid cycle of operation, the stem 78 which moves to the left as viewed in FIG. 3 to close valve opening 88 also urges the check valve 110 from its seat 112 to permit air in the cavity 98 to enter the logic cavity 118 formed between the cover plate 116 and housing 33. The relatively high pressure air in the logic cavity also is established in the passage 132 (FIG. 2) and in the chamber 137 to urge the piston 136 and plunger 138 downwardly as viewed in FIG. 4 so that the stem 140 enters the flow path of air entering at the supply port 18 and restricts its rate of flow. However, a certain amount of air can pass the restricted stem portion 140 through the open valve 55, 60 to the relatively large chamber 62 below the piston 36 and from there to the delivery port 19 and the brake chamber 21. As long as the treadle valve 11 remains actuated and after the solenoid 74 is energized the first time, the logic cavity 118 will be pressurized and maintain the restricting stem 140 in the flow path from the supply port 18 to the chamber 62. As a consequence, with the solenoid being cycled in the antiskid mode of operation, the brakes will be released in a normal manner but will be reapplied at a restricted rate.

After the antiskid stage of operation is completed and the operator releases the brakes by releasing the treadle valve 11, the air at the control port 15 exhausts from the treadle valve in the usual manner. Because of the pressure drop at the control port 15, the pressure in the logic cavity 118 will be relatively higher. This causes the pressure differential acting on the check valve 120 to open the port 124 and exhaust air from the logic cavity 118 to the control passage 15. Such release of the pressure also relieves pressure in the chamber 137 and permits the piston 136 and the flow restrictor to return to its original position under the urging of the pressure at the supply port 18 acting on the plunger 138. Also the air from the cavity 38 above the control piston 36 in the relay valve section 32 is free to exhaust through passage 92 and the chamber 90 and to control port 15 so that the mechanism returns to its original position. Threafter, any application of the brakes is made without restriction of air flow between the control port 15 and control chamber 38 and between the supply port 18 and the chamber 62.

In the preferred embodiment of the invention, approximately 100 psi. of air pressure is required to open the check valve 110 as determined by the valve of spring 114. This prevents air from entering the logic cavity 118 and therefore the chamber 137 which moves the restricting supply air plunger 138 when pressure in the control system at the port 15 is below the 100 psi. level. This prevents restriction of supply air from the port 18 except in the antiskid cycle of operation or when air at the control port 15 is in excess or 100 psi. Since the maximum braking and therefore wheel lock, will occur well below the 100 psi. level, the spring 114 serves to maintain valve 110 closed during normal braking. However, with the vehicle at a complete stop, the operator can apply the treadle valve 11 to supply air in excess of 100 psi. This causes the check valve 110 to establish pressure in the logic cavity 118 and chamber 137 and move the flow restrictor 138. When the foot pedal pressure at the treadle valve 11 is released and air is exhausted from the vairous control passages connected to control port 15, the check valve 120 will open due to the pressure differential in the logic cavity 118 and chamber 126 thereby relieving the air in the logic cavity 118 and will permit the flow restrictor 138 to return to its original position. In this manner the critical components for antiskid control, which may occur only rarely may be operated periodically to insure that they do not stick and will operate in the event antiskid control is required.

It will now be seen that an air brake antiskid control has been provided in which the rate at which the brakes are reapplied after they have been released in the antiskid mode of brake operation is regulated to minimizing exceeding the pressure level at which a subsequent wheel lock condition will occur so that when the brakes are again automatically released it is from a lower pressure level, thereby conversing air. This is achieved by mechanism restricting the rate at which air can be delivered from the source to the brake applying chambers during antiskid operations but does not impair normal brake operations. In addition, the components of the restrictor are so arranged that they may be periodically operated by the operator without the necessity of encountering wheel lock conditions to insure that the parts will function on the rare but critical occasion that antiskid control is required.

While a preferred embodiment of the invention has been shown and described, it will be understood that the various changes and modifications can be made without departing from the spirit of the invention.

What is claimed is:

1. In an antiskid air brake system for a vehicle having means to signal the presence of brake lock condition at the wheel of a vehicle, the combination comprising:

a housing forming control, supply and delivery ports adapted for connection to a source of variable control pressure, a source of operating pressure and brake actuating mechanism, respectively;

relay valve means including a control chamber responsive to variable pressure at said control port to deliver air from said supply to said delivery port to apply the brake and from said delivery port to the atmosphere to release the brakes;

air metering means disposed between said supply and delivery ports and being movable from a first position maintaining full communication between said supply and delivery ports to a second position restricting air flow therebetween;

control valve means having a first position in which said control chamber communicates with said control port to receive variable control pressure to operate said brakes and a second position in which said control chamber is closed to said control port and open to the atmosphere to release said brakes;

said air metering means being movable from said first to said second position in response to movement of said control valve means to said second position, said metering means being retained in its said second position upon return movement of said control valve means to said first position; and solenoid means responsive to a signal to move said control valve means from said first to said second position and on termination of said signal from said second to said first position.

2. The combination of claim 1 in which said air metering means includes a pressure responsive portion disposed in a control cavity formed by said housing and in which said control cavity is in communication with said control port when said control valve means is in said second position.

3. The combination of claim 2 in which said metering means includes an additional pressure responsive portion exposed to pressure at said supply port to maintain said metering means in its said first position in the absence of pressure at said control cavity.

4. The combination of claim 2 in which one way check valve means is disposed between said control cavity and said control port and in which said one way check valve means normally closed for retaining pressure in said control cavity and is open when said control valve means is in said second position.

5. The combination of claim 4 in which said one way check valve means is engagable by said control valve means and in which said one way check valve means is moveable to an open position simultaneously with movement of said control valve means to said second position.

6. The combination of claim 4 and further comprising means biasing said one way check valve means to a closed position with a predetermined force and in which said one way check valve means is responsive to a pressure at said control port exerting a force on said check valve means in excess of said predetermined force to move to an open position independently of said control valve means.

7. The combination of claim 4 and further including additional one way check valve means disposed between said control cavity and said control port to open and relieve pressure in said control cavity in the absence of pressure at said control port.

8. The combination of claim 7 in which said predetermined force is greater than the force resulting from pressure at said control port producing said signal.

9. The combination of claim 1 and further comprising passage means between said supply and delivery ports and in which said metering means includes a plunger moveable into said passage means to restrict air flow.

10. The combination of claim 2 in which said pressure responsive portion is a piston.

11. The combination of claim 3 in which said metering means includes an additional pressure responsive portion exposed to pressure at said supply port to maintain said metering means in said first position in the absence of pressure in said control cavity.

12. In an antiskid control mechanism for a vehicle having an air brake system and means to signal the presence of a brake lock condition at a wheel of a vehicle, the combination comprising:

a housing forming control, supply and delivery ports adapted for connection to a source of variable control pressure, a source of operating pressure and brake actuating mechanism, respectively;

relay valve means including a control chamber responsive to variable pressure at said control port to deliver air from said supply to said delivery port to apply the brakes and from said delivery port to the atmosphere to release the brakes;

air metering means having a control cavity responsive to pressure to restrict the passage of air from said supply port to said delivery port;

control valve means having a first position in which said control port communicates with said control chamber to receive variable pressure air to operate said brakes and a second position in which said control port is closed to said control chamber and open to said control cavity of said metering means to restrict passage of air from said supply port to said delivery port during application of said brakes; and, solenoid means responsive to a signal to move said control valve means from said first to said second position and on termination of said signal from said second to said first position.

13. The combination of claim 12 and further comprising first and second check valve means positioned between said control cavity and said control port, said first one way check valve means being moveable from a normally closed position in response to movement of said control valve means to its said second position to admit air from said control port to said control cavity, said second one way check valve means being moveable from a normally closed position in response to pressure in said control cavity and in the absence of pressure at said control port.

14. The combination of claim 13 in which said air metering means includes a plunger responsive to pressure in said control cavity to move air from a first position in which the passage of air from said supply port to said delivery port is unrestricted to a second position in which the passage of air is restricted, said plunger including a pressure responsive means for moving the plunger to its said first position in response to pressure at said supply port and the absence of pressure in said control cavity.

* * * * *

UNITED STATES PATENT OFFICE
CERTIFICATE OF CORRECTION

Patent No. 3,857,614　　　　　　　Dated　December 31, 1974

Inventor(s) Sham L. Kurichh

It is certified that error appears in the above-identified patent and that said Letters Patent are hereby corrected as shown below:

>　　In column 1, line 32, "in" should be --is--.
>　　In column 2, line 35, after "thereto" insert --in--;
>　　line 37, "slidable" should be --slidably--.
>　　In column 6, line 33, "Threafter" should read
>　　--Thereafter--.
>　　In column 7, lines 2 and 3, "minimizing" should
>　　read --minimize--.
>　　In column 8, line 1, after "means" insert -- is--.
>　　In column 10, line 3, delete "air".

Signed and sealed this ?th day of April 1975.

(SEAL)
Attest:

RUTH C. MASON
Attesting Officer

C. MARSHALL DANN
Commissioner of Patents
and Trademarks